(12) United States Patent
Gong

(10) Patent No.: US 10,744,453 B2
(45) Date of Patent: Aug. 18, 2020

(54) MARINE EXHAUST GAS SCRUBBING AND BALLAST WATER DISINFECTION SYSTEM

(71) Applicant: Terry Gong, Moraga, CA (US)

(72) Inventor: Terry Gong, Moraga, CA (US)

(73) Assignee: Earth Renaissance Technologies, LLC, Salt Lake City, UT (US)

( * ) Notice: Subject to any disclaimer, the term of this patent is extended or adjusted under 35 U.S.C. 154(b) by 172 days.

(21) Appl. No.: 16/112,739

(22) Filed: Aug. 26, 2018

(65) Prior Publication Data

US 2020/0061527 A1   Feb. 27, 2020

(51) Int. Cl.
| | |
|---|---|
| *B01D 53/14* | (2006.01) |
| *B01D 47/06* | (2006.01) |
| *C02F 1/66* | (2006.01) |
| *C02F 1/50* | (2006.01) |
| *B63J 4/00* | (2006.01) |
| *B63H 21/32* | (2006.01) |
| *C02F 103/00* | (2006.01) |
| *C02F 103/08* | (2006.01) |
| *C02F 103/18* | (2006.01) |

(52) U.S. Cl.
CPC ......... *B01D 53/1481* (2013.01); *B01D 47/06* (2013.01); *B01D 53/1487* (2013.01); *B63H 21/32* (2013.01); *B63J 4/002* (2013.01); *C02F 1/50* (2013.01); *C02F 1/66* (2013.01); *B01D 2252/1035* (2013.01); *C02F 2103/008* (2013.01); *C02F 2103/08* (2013.01); *C02F 2103/18* (2013.01); *C02F 2201/001* (2013.01); *C02F 2201/008* (2013.01); *C02F 2303/04* (2013.01)

(58) Field of Classification Search
None
See application file for complete search history.

(56) References Cited

U.S. PATENT DOCUMENTS

| | | | |
|---|---|---|---|
| 8,449,778 B2 | 5/2013 | Gong et al. | |
| 9,216,376 B2 * | 12/2015 | Liu | ........................ B01D 47/12 |
| 2016/0332113 A1 * | 11/2016 | Jenkins | ................ B01D 53/504 |
| 2018/0154309 A1 | 6/2018 | Patterson et al. | |

OTHER PUBLICATIONS

Wet or Dry? Which Scrubber Type will Reign Supreme? Maryruth Belsey Prieb, International Quality Production Center, www.jadecreative.com/media/13881/Wet or Dry—Which. . . .

* cited by examiner

*Primary Examiner* — Derek N Mueller
(74) *Attorney, Agent, or Firm* — Marcus G. Theodore

(57) ABSTRACT

A combination marine exhaust gas scrubber and ballast disinfection system using seawater/water surrounding a ship to reduce/scrub smoke-stack emissions and produce a disinfected seawater/water for ballast, which can then be periodically or continually discharged back into the seawater/water body without concern for the spread of non-invasive species.

7 Claims, 3 Drawing Sheets

MARINE EXHAUST GAS SCRUBBING AND BALLAST WATER DISINFECTION SYSTEM

BACKGROUND OF THE INVENTION

Field

This invention relates to marine gas scrubbers and ballast water disinfection systems. In particular, it relates to a combination marine exhaust gas scrubber and ballast disinfection system using seawater/water surrounding a ship to reduce/scrub smoke-stack emissions and produce a disinfected seawater/water for ballast, which can then be periodically or continually discharged back into the seawater/water body without concern for the spread of non-invasive species.

Statement of the Art

Numerous marine gas scrubbing systems are known to meet the new IMO regulations for controlling shipping vessel air pollution, which require significant reduction in sulfur oxides (SOx), nitrogen oxides (NOx), and carbon dioxide (CO2) emissions. There are several types of wet and dry scrubber exhaust gas cleaning systems (EGCS) for reducing air emissions having different advantages and disadvantages[1].

[1] See Wet or Dry? Which Scrubber Type will Reign Supreme? by Maryruth Belsey Priebe, International Quality and Production Center, www.jadecreative.com/media/13881/Wet or Dry—Which . . .

"Wet scrubbers use either fresh or sea water to remove gas impurities. The wastewater is then discharged into the sea or retained within a closed loop when discharging it is not permitted. An open loop sea water system is a passive solution in that it has very few moving parts and requires hydraulic pressure provided by a pump in order to run. The system includes pumps and strainers, was water filters, sludge handlers, effluent monitors, and exhaust gas monitors.

In an open loop system, waste water is simply put overboard while at sea. This type of system requires regular maintenance, de-fouling, and operational checks, but is otherwise low maintenance. It also doesn't need a great deal of space for storage of waste material.

In a closed loop fresh water wet scrubbing system, there's a buffer tank, a heat exchanger, pumps and strainers, a sodium hydroxide unit, and water treatment device. Like the open system, there are no internal moving parts, and other than occasional inspections there is very little maintenance required. One disadvantage of this option, however, is that it requires storage space (the buffer tank) to hold waste water until it can be discharged.

The downside to using a wet scrubber is that it cools the exhaust gas, a problem that's not faced by dry scrubbers. Additionally, with wet scrubbers, selective catalytic reduction systems must operate before the scrubbers. Fitting all of this together, especially for dual-fuel engines can be quite complex.

Dry scrubbers also effectively remove exhaust gas pollutants, but they employ a filter or bed of granulated hydrated lime. The chemical reaction between the SOx and the lime creates calcium sulfate which can then be disposed of as solid waste when the ship reaches a port.

A dry scrubber offers several advantages. First, this type of system does not result in the production of liquid effluent that must be disposed of overboard. Of course, most importantly, dry scrubbers will reduce NOx emissions substantially, however, on the downside, dry scrubbers require significant onboard storage to handle the dry bulk reactants and products associated with the process."

Patterson, US 2018/0154309 published Jun. 7, 2018 is an example of a low pressure drop Exhaust Gas Wet Scrubber produced by Belco Technologies Corporation, a DuPont business unit shown in FIG. 1, attached. The Belco scrubber system includes an in-line, wet scrubber located in the funnel of the ship. The scrubber includes a generally cylindrical housing having an inlet fitting at the bottom longitudinal end of the scrubber housing and an outlet fitting at a top longitudinal end of the scrubber housing. The overall shape of the scrubber in its normal (vertical) operating position fits within the funnel.

The scrubber can function to silence engine noise, thereby replacing the function of a silencer. An exhaust mixer is mounted directly on the scrubber inlet so that the exhaust of multiple engines may be serviced by one scrubber.

The Internal components of the scrubber have an inlet fitting that extends into the interior of the housing and opens in the interior at a mouth. The mouth is covered by a diverter cap that prevents water used in the scrubber from entering the mouth. A tiered lower absorber spray head, a middle absorber spray head, and an upper absorber spray head each include nozzles to spray water within the scrubber housing. A droplet separator is located near the top of the housing to capture entrained water droplets. The droplet separator includes rows of curved pieces (sometimes called "chevrons" for their general shape) that define tortuous paths for scrubbed exhaust gas leaving the scrubber facilitating water droplet removal. A wash sprayer located under the droplet separator is periodically activated to spray water or other solution through nozzles for cleaning the chevrons forming the droplet separator.

A heat exchanger or hot air injector may also be provided near the outlet fitting to heat the exiting exhaust gas for reducing a water vapor plume leaving the scrubber system. In one embodiment, the internal components are constructed so that the scrubber can run dry with internal components sufficiently robust as to withstand hot exhaust gas not cooled by any water flowing within the scrubber.

In use hot, dirty exhaust gas from one or more of the engines enters the inlet fitting of the scrubber and exits the mouth within the scrubber housing. In some instances, the entering exhaust gas might be on the order of 350 degrees C. The diverter cap alters the flow of exhaust gas from a generally vertical direction to a generally lateral direction. The diverter cap also redirects water coming down from the lower, middle and upper absorber spray heads laterally off of the sides of the diverter cap. The hot exhaust moving out from under the diverter cap passes through a curtain of water around the diverter cap. A substantial amount of water is evaporated so that much of the heat of the exhaust gas entering the scrubber is removed immediately upon entry into the interior of the scrubber housing. The quenched gas and entrained water flows upward from the diverter cap in the housing. In addition to providing further cooling of the exhaust gas, the water captures particulates in the gas. A reagent may be added to the water sprayed from the lower, middle and upper absorber spray heads to promote the absorption of a particular pollutant by the water. For example, a reagent may be added to promote absorption of $SO_2$. Water droplets entrained in the gas flow passing above the upper absorber spray head encounter the droplet separator. The changes in direction of the gas flows passing through the tortuous paths defined by the chevrons of the droplet separator promotes collection of water droplets from the gas flow on the surfaces of the chevrons. Collected water on the chevrons may fall down toward the bottom of the scrubber housing. Water containing particulates and $SO_2$ from the droplet separator and from the lower, middle and upper absorber spray heads falls down within the scrubber housing to a slanted floor at the bottom of the housing. The floor is located well below the mouth of the inlet fitting to inhibit water collected at the bottom of the housing from entering the inlet fitting. A drain outlet is located on the lowest side of the slanted floor to permit dirty liquid to exit the scrubber for disposal.

These wet scrubbers are not designed to disinfect ship ballast water using sulfur dioxide. Gong et al., U.S. Pat. No. 8,449,778 issued May 28, 2013 discloses a method of treatment ballast water with sulfurous acid to kill invasive species and remove oxygen from the ballast water to preserve hulls from rusting, while preventing contamination of discharge waters with invasive species.

There thus remains a need for a hybrid combination marine exhaust gas scrubbing and ballast water disinfection system. The system described below provides such a system.

BRIEF SUMMARY OF THE INVENTION

The invention comprises a marine exhaust gas scrubbing and ballast water disinfection method removing engine and boiler exhaust contaminants including sulfur dioxide ($SO_2$), nitrous oxides (NOx), oils, and small particles, with seawater containing invasive species to capture and use sulfur dioxide to suppress the transfer and spread of invasive species when used as ships ballast before discharged. It comprises drawing in seawater and directing the seawater into a wet scrubber with a plurality of nozzles located in the funnel of a ship to spray seawater into the exhaust gas flow from the ship engines or boilers to absorb $SO_2$, NOx, and entrain oils and suspended solids into the seawater. The oils and suspended solids in the seawater are then separated forming an acid treated seawater. Sufficient sulfur dioxide is then added to the acid treated seawater to suppress the invasive species. The pH of the acid treated seawater is then raised before use as ships ballast water. The ships ballast water is then periodically or continuously discharged back into the sea.

A droplet separator is located near the top of the scrubber to capture entrained water droplets. A heat exchanger or hot air injector may be positioned near the scrubber to heat exiting exhaust gas for reducing water vapor plumes leaving the scrubber.

The components of the scrubber are preferably constructed to run dry, withstanding hot exhaust gas not cooled by any seawater flowing within the scrubber.

The method includes adding reagents to the seawater to promote the absorption of pollutants in the seawater. Preferred reagents for absorption of $SO_2$ are caustics, such as lime to also raise the pH of the ballast water before discharge.

Injecting sufficient sulfurous acid into the ballast water containing nonindigenous invasive species lowers the pH and provides free $SO_2$, sulfites and bisulfites to kill the invasive species, and provide a reducing agent to minimize hull oxidation corrosion.

The pH selected varies upon the dwell exposure time required for kill of the invasive species. For rapid 10-minute kill, a pH of less than 2 is required. When longer dwell times are possible, an elevated pH of up to 4.5 may be used for longer kill. The amount of acid is therefore dependent upon the buffering alkalinity of the ballast water, with more sulfurous acid required first to neutralize buffering bicarbonates in the ballast water before the neutralized pH is lowered to that required for kill.

In addition, more sulfurous acid may be required to remove excessive oxygen contained in the ballast water. By reducing oxygen levels in the ballast water the need for sacrificial anodes for corrosion control is reduced, thereby lightening loads.

The method is used just before discharge of the ballast water, or it may be employed during transport to provide a reducing environment inside the hull to prevent corrosion.

Before discharge of the sulfurous acid treated ballast water, it may be necessary to raise its pH to not interfere with native animal and plant species. For pH adjustment, usually an environmentally compatible alkaline agent, such as lime, is used. However, this step is usually not necessary where the volume of the surrounding waters is sufficient to dilute the acid to that required for environmental disposal.

The $SO_2$ may be carried in tanks or generated on site using a sulfur burner to provide the volume of sulfurous acid as needed.

Various wet scrubbers for seawater may be used to provide treated ballast. An example of a preferred scrubbing system is that produced by DuPont Belco Clean Air Technologies described in US publication no. 2018/0154309 dated Jun. 7, 2018. This Belco scrubber system includes an in-line, wet scrubber located in the funnel of the ship. The scrubber includes a generally cylindrical housing having an inlet fitting at a first (bottom) longitudinal end of the scrubber housing and an outlet fitting at a second, opposite (top) longitudinal end of the scrubber housing. The overall shape of the scrubber and its normal (vertical) operating position make it ideal for use in the ship. The elongate configuration of the scrubber corresponds closely to the configuration of the funnel. The scrubber can fit in the place conventionally used for a silencer (not shown). The scrubber can function to silence engine noise, thereby replacing the function of the silencer. The slender configuration of the scrubber and of the overall scrubber system also facilitates the installation of more than one scrubber in the funnel, should that be required. Three exhaust pipes are shown attached to the inlet fitting by an exhaust mixer. The exhaust mixer 37 is mounted directly on the scrubber inlet fitting. All three engines are serviced by one scrubber. This arrangement has, among other advantages, the saving of space within the funnel, as compared to providing a separate scrubber for each engine. The outlet fitting may be connected to a discharge stack for release of cleaned exhaust gas to the atmosphere.

Internal components of the scrubber have an inlet fitting, which extends into the interior of the housing and opens in the interior at a mouth. The mouth is covered by a diverter cap that prevents water used in the scrubber from entering the mouth. A lower absorber spray head, a middle absorber spray head, and an upper absorber spray head each include nozzles to spray water within the scrubber housing. A droplet separator is located near the top of the housing to capture entrained water droplets. The droplet separator includes rows of curved pieces (sometimes called "chevrons" for their general shape) that define tortuous paths for scrubbed exhaust gas leaving the scrubber facilitating water droplet removal. A wash sprayer located under the droplet separator can be periodically activated to spray water or other solution through nozzles for cleaning the chevrons forming the droplet separator. A heat exchanger or hot air injector may also be provided near the outlet fitting to heat the exiting exhaust gas for reducing a water vapor plume leaving the scrubber system. In one embodiment, the internal components are constructed so that the scrubber can run dry. The internal components in that embodiment are sufficiently robust as to withstand hot exhaust gas not cooled by any water flowing within the scrubber.

In use hot, dirty exhaust gas from one or more of the engines enters the inlet fitting of the scrubber and exits the mouth within the scrubber housing. In some instances, the entering exhaust gas might be on the order of 350.degree. C. The diverter cap alters the flow of exhaust gas from a generally vertical direction to a generally lateral direction. The diverter cap also redirects water coming down from the lower, middle and upper absorber spray heads laterally off of the sides of the diverter cap. The hot exhaust moving out from under the diverter cap passes through a curtain of water around the diverter cap. A substantial amount of water is evaporated so that much of the heat of the exhaust gas entering the scrubber is removed immediately upon entry into the interior of the scrubber housing. The quenched gas and entrained water flows upward from the diverter cap in the housing. In addition to providing further cooling of the exhaust gas, the water captures particulates in the gas. A reagent may be added to the water sprayed from the lower, middle and upper absorber spray heads to promote the absorption of a particular pollutant by the water. For example, a reagent may be added to promote absorption of $SO_2$. It will be understood that the particulates and $SO_2$ are considered "constituents" of the exhaust gas. Water droplets entrained in the gas flow passing above the upper absorber spray head encounter the droplet separator. The changes in direction of the gas flows passing through the tortuous paths defined by the chevrons of the droplet separator promotes collection of water droplets from the gas flow on the surfaces of the chevrons. Collected water on the chevrons may fall down toward the bottom of the scrubber housing. Water containing particulates and $SO_2$ from the droplet separator and from the lower, middle and upper absorber spray heads falls down within the scrubber housing to a slanted floor at the bottom of the housing. The floor is located well below the mouth of the inlet fitting to inhibit water collected at the bottom of the housing from entering the inlet fitting. A drain outlet is located on the lowest side of the slanted floor to permit dirty liquid to exit the scrubber.

The Belco scrubber system may be an open loop system. In this embodiment, the engines each have an optional bypass line controlled by a respective valve that permits the scrubber system to be bypassed. Shut off valves close off the exhaust mixer from the exhaust gas leaving the engines, and work in concert with the bypass valves to achieve bypass of the scrubber system. An economizer or economizers may be located just upstream from the exhaust mixer to recover heat from the engines. An economizer may additionally or alternatively be located downstream of the exhaust mixer to recover heat from the engines.

A variable flowrate circulation pump can draw water to be used by the scrubber from the ship's sea chest. The sea chest may have water from the sea, river, lake or other body of water. The pump delivers water to the lower, middle and upper absorber spray heads, and also to the wash sprayer in the scrubber by way of lines. A valve controlled by a timer periodically feeds water from the lines into the wash sprayer. A sensor near the outlet fitting of the scrubber measures the ratio of $SO_2$ to $CO_2$. The measurement of this ratio is used to control the flowrate of the pump. If the ratio goes up, the speed or flowrate of the pump is increased. Similarly, if the ratio of $SO_2$ to $CO_2$ goes down the flowrate from the pump may be reduced automatically. Other sensors, such as a pH sensor may also be used in control of aspects of the scrubber system. Water containing particulates and absorbed $SO_2$ leaving the scrubber through the drain passes through drain conduit to a residence tank. A hydro cyclone pump draws liquid from the residence tank and feeds it to a hydro cyclone separation vessel. Particulate is separated from wash water in the hydro cyclone vessel, concentrated as sludge and delivered from the bottom of the hydro cyclone vessel to a sludge storage tank via lines. Sludge can be offloaded from the ship to a disposal receptacle, when the ship is docked. Wash water exits the top of the hydro cyclone vessel where it can be treated and delivered through lines back to the sea at. Sea water has an alkalinity that makes it a good medium for removing $SO_2$. Accordingly, no reagent to aid in absorbing $SO_2$ is needed, particularly where the sea water is used only once before being returned to the ocean. For other circulation designs, additional reagent may be required.

One illustrated scrubber system is a closed loop system. Parts of the closed scrubber system correspond to the parts of the open scrubber system with essentially the same function as in the open loop configuration. A circulation pump draws water for a scrubber from a residence tank, instead of from the ship's sea chest. In this embodiment, the circulation pump supplies water from the residence tank only to the lower, middle and supper absorber spray heads. The wash sprayer is fed by make-up water from the sea chest via lines using a pump. Make up water from the sea chest is also supplied on demand to the residence tank. A valve is controlled by a timer for periodically delivering water to the wash sprayer. Demand for make-up water to the residence tank is controlled by a level sensor on the residence tank used to operate a valve. Liquid in the residence tank will have been heated by the exhaust gases in the scrubber and could be less effective in removing heat from the exhaust gas when recycled through the scrubber. Accordingly, water circulated from the residence tank to the lower, middle and upper absorber spray heads through lines may be cooled in a heat exchanger, through which the line passes. Coolant from a supply designated can be in the form the sea, river, lake or other body of water. The coolant can be delivered through line to the heat exchanger and then discharged after it has removed heat from the water in line at a cooling water outlet. The amount of cooling water delivered to the heat exchanger is regulated by a valve that is controlled by a temperature sensor on the scrubber. The temperature sensor detects the temperature of the cleaned exhaust gas exiting the scrubber. More cooling water is supplied to the heat exchanger as the temperature of the cleaned exhaust gas measured by the temperature sensor rises. Less water is used if the cleaned exhaust gas temperature falls.

Reuse of the water that leaves the scrubber by drain conduit to feed the lower, middle and upper absorber spray heads requires monitoring of the reused water. A pH sensor monitors water drawn from the residence tank by the pump. Absorption of $SO_2$ over time causes the pH of the water to fall. To offset this, a reagent is added to the water in the residence tank when the pH sensor detects a sufficiently low pH in the water drawn from the residence tank by pump. More specifically, the pH sensor activates a reagent pump to deliver reagent from a storage tank through lines to the residence tank. Any suitable reagent may be used, and in one instance NaOH is used as a reagent to promote continued absorption of $SO_2$ in the scrubber by water recycled from the residence tank'. Absorption of $SO_2$ and reactions with the reagent also causes an increase the total dissolved salts in the water of the residence tank when the water is reused. A total dissolved salts sensor can detect this in water leaving the residence tank and cause a valve to open for purging water from the line to a wash water treatment unit. Particulate is separated from the water in the wash water treatment unit and concentrated as sludge. Sludge is delivered from the wash water treatment unit to a sludge storage tank. Separated water is cleaned and then discharged to the sea, river, lake or other body of water by way of discharge outlet'. In the closed loop scrubber system, less water is taken from and reintroduced into the body of water in operation.

In another embodiment, an exhaust mixer is spaced away and offset from the inlet fitting of the scrubber. The exhaust mixer is connected to the exhaust pipes as described above in relation to the scrubber system. The location of the exhaust mixer may be necessitated by the available space and relative locations of the scrubber and the engines. It will be understood that the exhaust mixer could have a different orientation. The exhaust mixer can be connected to the inlet fitting of the scrubber by a connecting pipe. The pipe is configured for connection at a first end to the scrubber in fluid communication with the inlet of scrubber. A second end of the pipe is connected to the exhaust mixer in fluid communication with the outlet of the exhaust mixer.

Water containing particulates and absorbed $SO_2$ leaving the scrubber through the drain passes through drain conduit to an oil and water separator. The separated liquids are then treated with additional $SO_2$ required to kill any invasive species and is then pH adjusted in a combination caustic feeder and mixing tank. A stainless steel acid pump then transfer the pH adjusted seawater/water to the ship's ballast tanks for periodic discharge into the sea or a body of water. This ballast water is disinfected and pH conditioned to meet the discharge requirements of the receiving body.

A portion of the pH conditioned ballast water is diverted into a sulfur dioxide generator to generate on-site as needed, additional $SO_2$ injected into the ballast water to insure sufficient sulfites/bisulfites to accomplish disinfection and invasive species kill before discharge. The hybrid marine scrubbing and ballast water disinfection system can be open looped or closed looped depending on the voyage length and requirements of the ballast receiving waters.

To conserve chemical consumption, the ballast tank system of the ship may be filled with disinfected and invasive species killed pH adjusted water, and held for the duration of the journey by closing the discharge valves. In this variation, scrubbed seawater is continually discharged into the seawater/water during the voyage. Upon arrival in port, the disinfected ballast water is then discharged into the receiving waters without concern for the spread of invasive species.

BRIEF DESCRIPTION OF THE SEVERAL VIEWS OF THE DRAWINGS

In order that the manner in which the above-recited and other features and advantages of the invention are obtained will be readily understood, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE INVENTION

The presently preferred embodiments of the present invention will be best understood by reference to the drawings, wherein like parts are designated by like numerals throughout. It will be readily understood that the components of the present invention, as generally described and illustrated in the figures herein, could be arranged and designed in a wide variety of different configurations. Thus, the following more detailed description of the embodiments of the FIG. 1-3 of the present invention, as represented in FIG. 3, is not intended to limit the scope of the invention, as claimed, but is merely representative of presently preferred embodiments of the invention.

Figure 1:
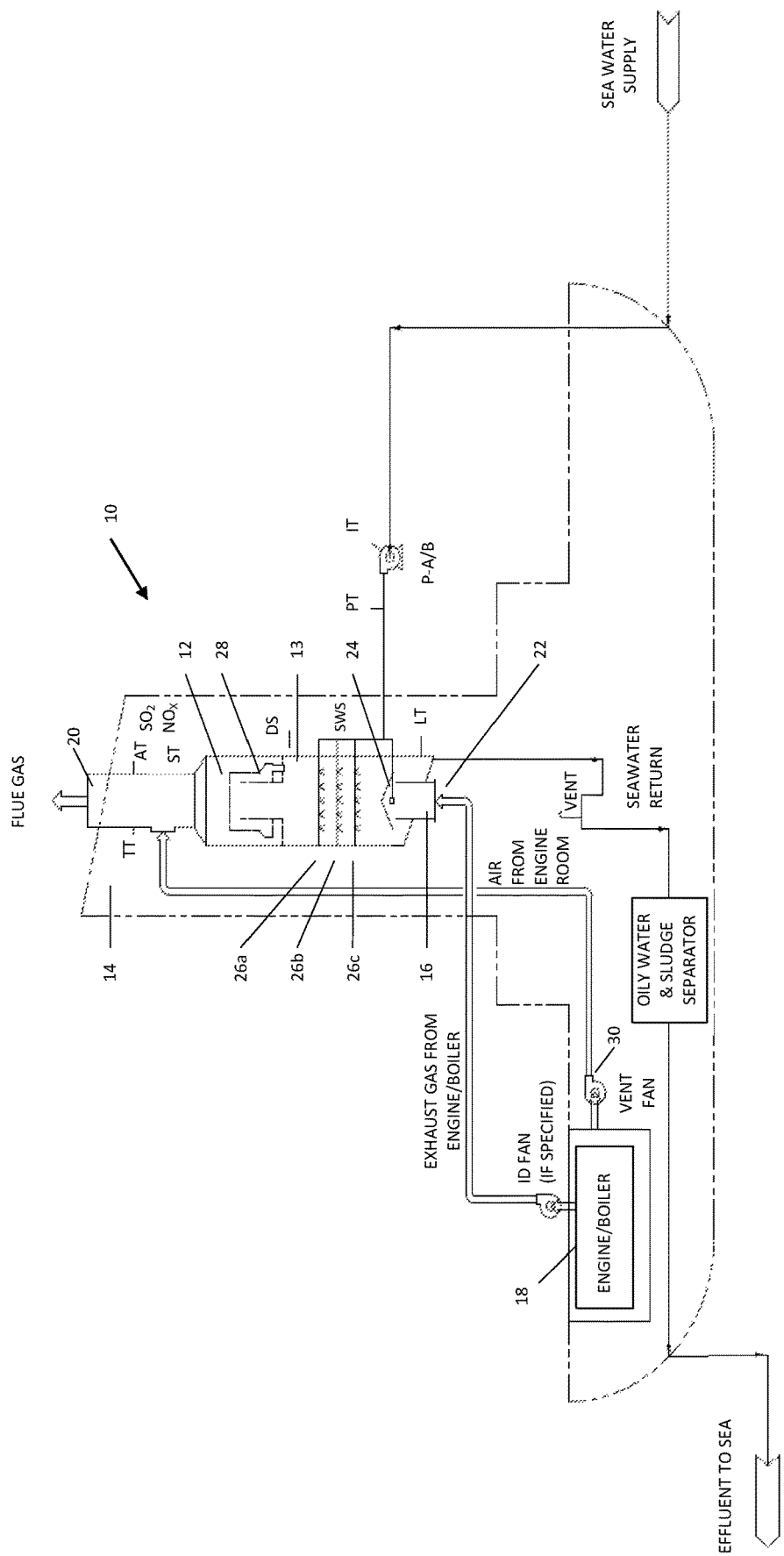
FIG. 1 is a flow schematic of the Belco seawater design.

FIG. 1 is a flow schematic of the Belco Seawater prior art design. This Belco scrubber system 10 includes an in-line, wet scrubber 12 located in the funnel 14 of the ship. The scrubber 12 includes a generally cylindrical housing 13 having an inlet fitting 16 at a first (bottom) longitudinal end of the scrubber 12 housing 13 receives the exhaust gas from the engine/boiler 18 for scrubbing and an outlet fitting 20 at a second, opposite (top) longitudinal end of the scrubber housing. The elongate configuration of the scrubber 12 corresponds closely to the configuration of the funnel 14.

Internal components of the scrubber 12 have an inlet fitting 16, which extends into the interior of the housing 13 and opens in the interior at a mouth 22. The mouth 22 is covered by a diverter cap 24 that prevents water used in the scrubber 12 from entering the mouth 22. An upper absorber spray head 26*a*, a middle absorber spray head 26*b*, and a lower absorber spray head 26*c* each include nozzles to spray water within the scrubber housing 13. A droplet separator 28 is located near the top of the housing 13 to capture entrained water droplets. The droplet separator 28 includes rows of curved pieces (sometimes called "chevrons" for their general shape) (not shown) that define tortuous paths for scrubbed exhaust gas leaving the scrubber facilitating water droplet removal. A wash sprayer (not shown) located under the droplet separator 28 can be periodically activated to spray water or other solution through nozzles for cleaning the chevrons forming the droplet separator.

A heat exchanger or hot air injector 30 may also be provided near the outlet fitting to heat the exiting exhaust gas for reducing a water vapor plume leaving the scrubber system.

The quenched gas and entrained water flows upward from the diverter cap 24 in the housing 13. In addition to providing further cooling of the exhaust gas, the water captures particulates in the exhaust gas.

Figure 2:
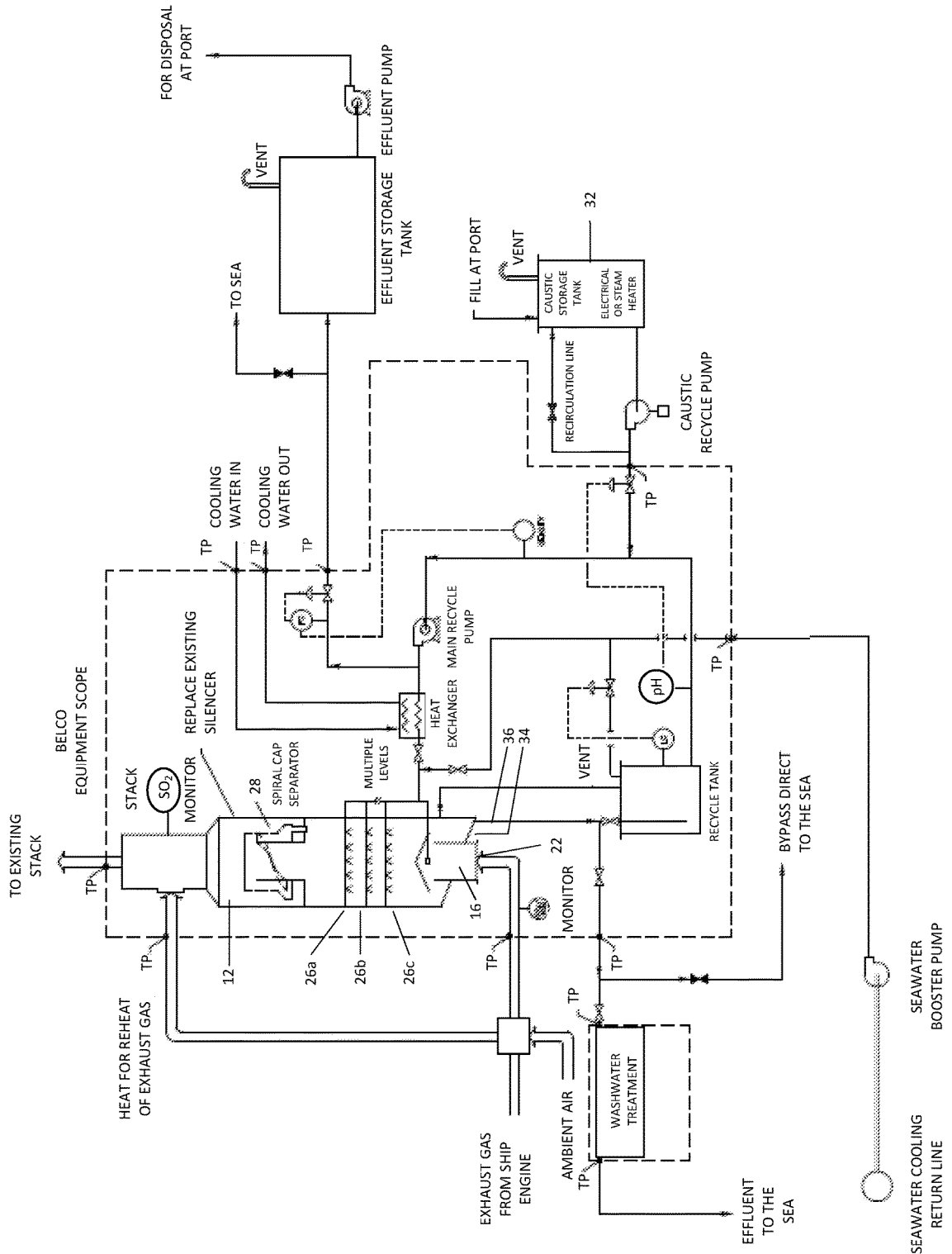
FIG. 2 is a flow schematic of the Belco seawater of FIG. 1 with caustic design.
Figure 3:
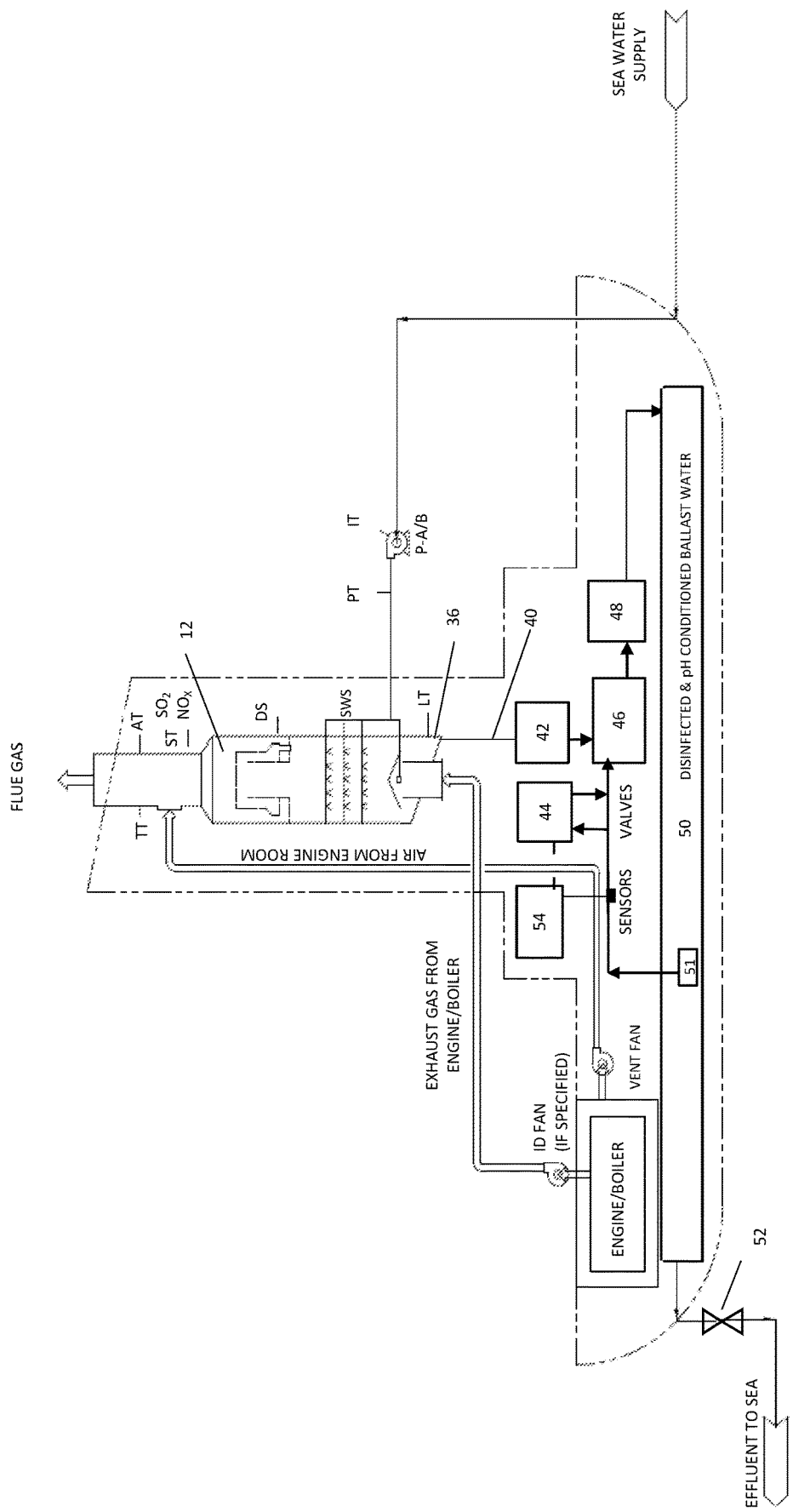
FIG. 3 is flow schematic of the present invention.

As shown in FIG. 2, which is a flow schematic of the prior art Belco seawater design of FIG. 1 with caustic design, a reagent from a caustic storage tank 32 may be added to the water sprayed from the upper, middle, and lower absorber spray heads 26*a*, 26*b*, 26*c*, to promote the absorption of $SO_2$ pollutant by the water. Water droplets entrained in the gas flow passing above the upper absorber spray head 26*a* encounter the droplet separator 28. The changes in direction of the gas flows passing through the tortuous paths defined by the chevrons of the droplet separator promotes collection of water droplets from the gas flow on the surfaces of the chevrons. Collected water on the chevrons may fall down toward the bottom of the scrubber housing. Water containing particulates and $SO_2$ from the droplet separator and from the upper, middle, and lower absorber spray heads 26a, 26b, 26c falls down within the scrubber housing 13 to a slanted floor 34 at the bottom of the housing. The floor 34 is located well below the mouth 22 of the inlet fitting 16 to inhibit water collected at the bottom of the housing 13 from entering the inlet fitting 16. A drain outlet 36 is located on the lowest side of the slanted floor 34 to permit dirty liquid to exit the scrubber 12.

FIG. 3 is flow schematic of an embodiment of the present invention. Water containing particulates and absorbed $SO_2$ leaving the scrubber 12 through the outlet drain 36 passes through drain conduit 40 to an oil and water separator 42. The separated liquids are then blended with ballast water treated with an additional amount of $SO_2$ from a sulfur dioxide generator 44 to kill any invasive species and is then pH adjusted in a combination caustic feeder and mixing tank 46. A stainless steel acid pump 48 then transfers the pH adjusted seawater/water to the ship's ballast tanks 50 for periodic discharge into the sea or a body of water. This ballast water is disinfected and pH conditioned to meet the discharge requirements of a receiving body.

To insure that the ballast water is being properly disinfected and pH conditioned, a submersible stainless steel booster pump 51, located within the far end of the ballast tank system, recirculates the entire ballast tank water system to insure chemical uniformity is attained. By installing electronic sensors on the recirculation line down-stream of the submersible stainless steel booster pump, these sensors measure the actual condition of the ballast water and will provide an electronic signal to the control system 54, to send the flow either directly back to the front end of the ballast tanks, or divert a portion of the flow through a sulfur dioxide generator 44 to add an additional amount of sulfur dioxide to insure that adequate disinfection and invasive species kill has been achieved, and/or back to the mixing tank 46 to further pH conditioning is needed to meet the ship's operational conditions while storing the water within the ballast tank system and to meet discharge requirements. The hybrid marine scrubbing and ballast water disinfection system shown is open-looped continually discharging scrubbed disinfected seawater/water back into the sea or water body. However, it may be either open looped or closed looped depending on the voyage length and requirements of the ballast receiving waters.

To conserve chemical consumption, the ballast tank system 50 of the ship disinfected and invasive species killed pH water, and held for the duration of the journey by closing the discharge valves 52. In this illustrated embodiment, the scrubbed seawater can be discharged into the seawater/water during the voyage with the discharge valve 52 open, or held for disinfection and invasive species kill prior to arriving to the destination port. Upon arrival in port, with all the of the ballast water properly disinfected and pH conditioned, the water can be easily verified and deemed safe to discharge into the receiving waters to increase the ships buoyancy in port without concern for the spread of invasive species or harm to the environment.

A control system 54 automatically controls the various components in accordance with the ship operations and storage and discharge requirements into the receiving body.

The present invention may be embodied in other specific forms without departing from its structures, methods, or other essential characteristics as broadly described herein and claimed hereinafter. The described embodiments are to be considered in all respects only as illustrative, and not restrictive. The scope of the invention is, therefore, indicated by the appended claims, rather than by the foregoing description. All changes that come within the meaning and range of equivalency of the claims are to be embraced within their scope.

I claim:

1. A marine exhaust gas scrubbing and ballast water disinfection method whereby contaminants including sulfur dioxide ($SO_2$), nitrous oxides (NOx), oils, and small particles, are removed from engine and boiler exhaust gas flow by contact with seawater/water containing invasive species thereby capturing sulfur dioxide and using said sulfur dioxide to suppress the transfer and spread of invasive species when said water/seawater is used as ships ballast before discharging comprising:
   a. drawing in seawater/water and directing the seawater/water into a wet scrubber with a plurality of nozzles located in the funnel of a ship to spray the seawater/water into the exhaust gas flow from the ship engines or boilers to absorb $SO_2$, and NOx, entering the wet scrubber and to entrain oils and suspended solids in the seawater/water,
   b. separating the oils and suspended solids in the seawater/water forming an acid treated seawater/water,
   c. adding sufficient sulfur dioxide to the acid treated seawater/water to suppress the invasive species,
   d. raising the pH of the acid treated seawater/water for use as ships ballast, and
   e. periodically or continuously discharging the ships ballast back into the sea/water.

2. A marine exhaust gas scrubbing and ballast water disinfection method according to claim 1, including a droplet separator located near the top of the wet scrubber to capture entrained water droplets.

3. A marine exhaust gas scrubbing and ballast water disinfection method according to claim 1, including a heat exchanger or hot air injector positioned near the exhaust gas flow leaving the wet scrubber to heat exiting exhaust gas for reducing water vapor plumes leaving the scrubber.

4. A marine exhaust gas scrubbing and ballast water disinfection method according to claim 1, wherein the wet scrubber is constructed of components configured to run dry and withstand hot exhaust gas not cooled by any seawater/water flowing within the wet scrubber.

5. A marine exhaust gas scrubbing and ballast water disinfection method according to claim 1, including reagents added to the seawater/water to promote the absorption of pollutants in the seawater/water.

6. A marine exhaust gas scrubbing and ballast water disinfection method according to claim 5, wherein the reagent added promotes absorption of $SO_2$.

7. A marine exhaust gas scrubbing and ballast water disinfection method according to claim 1 wherein the sulfur dioxide restores and maintains the operating efficiency of a ship's ballast system by suppressing and preventing the formation of mineral scaling; and the growth and reproduction of problematic organisms including at least one selected from the group consisting of viruses; bio-film; algae; kelp; vegetation; clams; mussels; and crabs.

* * * * *